United States Patent
Pinnamaneni et al.

(10) Patent No.: US 12,045,820 B2
(45) Date of Patent: Jul. 23, 2024

(54) METHODS AND SYSTEMS FOR VOICE COMMAND TRANSACTION AUTHENTICATION

(71) Applicant: Mastercard International Incorporated, Purchase, NY (US)

(72) Inventors: Venkata Satya Sivajee Pinnamaneni, Dardenne Prairie, MO (US); Kaushal Naveen Shetty, Thane (IN); Sachin Kumar Singh, Pune (IN)

(73) Assignee: Mastercard International Incorporated, Purchase, NY (US)

( * ) Notice: Subject to any disclaimer, the term of this patent is extended or adjusted under 35 U.S.C. 154(b) by 134 days.

(21) Appl. No.: 17/562,546

(22) Filed: Dec. 27, 2021

(65) Prior Publication Data

US 2023/0206236 A1   Jun. 29, 2023

(51) Int. Cl.
| | |
|---|---|
| *G06Q 40/00* | (2023.01) |
| *G06F 16/2457* | (2019.01) |
| *G06Q 20/40* | (2012.01) |
| *G10L 17/06* | (2013.01) |
| *G10L 17/22* | (2013.01) |
| *G10L 25/18* | (2013.01) |

(52) U.S. Cl.
CPC .  *G06Q 20/40145* (2013.01); *G06F 16/24578* (2019.01); *G06Q 20/4015* (2020.05); *G10L 17/06* (2013.01); *G10L 17/22* (2013.01); *G10L 25/18* (2013.01)

(58) Field of Classification Search
CPC ............... G06Q 20/40145; G06Q 20/4015
See application file for complete search history.

(56) References Cited

U.S. PATENT DOCUMENTS

| 8,589,167 B2 | 11/2013 | Baughman et al. |
| 10,136,262 B2 | 11/2018 | Bhanage |
| (Continued) | | |

OTHER PUBLICATIONS

A. Boles and P. Rad, "Voice biometrics: Deep learning-based voiceprint authentication system," 2017 12th System of Systems Engineering Conference (SoSE), Waikoloa, HI, USA, 2017, pp. 1-6, doi: 10.1109/SYSOSE.2017.7994971. (Year: 2017).*

Blue, Logan, et al., "Hello, Is It Me You're Looking For? Differentiating Between Human and Electronic Speakers for Voice Interface Security," In Proceedings of the 11th ACM Conference on Security & Privacy in Wireless and Mobile Networks (WiSec 2018, pp. 123-133).

(Continued)

*Primary Examiner* — Elizabeth H Rosen
*Assistant Examiner* — Mark H Gaw
(74) *Attorney, Agent, or Firm* — Hovey Williams LLP

(57) ABSTRACT

The disclosure describes techniques for authenticating a voice command transaction initiated by a consumer at a voice-activated digital assistant. The system determine a proximity score for a consumer device. The proximity score is based on a distance between the consumer device and the digital assistant. The system detects motion indicating presence of a person proximate the digital assistant (based on wireless signal data) and determines a motion score. The system receives voice data from the digital assistant and determines a voice differentiation score. The system determines a rank score for the consumer device based on historical transaction data associated with the device. The system analyzes the proximity score, motion score, voice differentiation score, and rank score using a voice command authentication model. Based on the analysis, the system determines an authentication score for the voice command transaction request.

15 Claims, 7 Drawing Sheets

(56) References Cited

U.S. PATENT DOCUMENTS

| | | |
|---|---|---|
| 10,503,469 B2 | 12/2019 | Rutherford et al. |
| 10,650,824 B1* | 5/2020 | Kesharaju et al. |
| 10,748,529 B1* | 8/2020 | Milden .................. G10L 15/22 |
| 11,605,374 B2* | 3/2023 | Kim ........................ G10L 15/32 |
| 2019/0278895 A1 | 9/2019 | Streit |
| 2019/0289000 A1 | 9/2019 | Kao |
| 2020/0090214 A1* | 3/2020 | Tushinskiy ............. G10L 15/22 |
| 2021/0125605 A1* | 4/2021 | Lee .......................... G06F 40/30 |
| 2021/0334732 A1* | 10/2021 | VanBuskirk .......... H04L 67/535 |

OTHER PUBLICATIONS

Zhao, Jijun, et al., "R-DEHM: CSI-Based Robust Duration Estimation of Human Motion with WiFi," Sensors 19, No. 6: 1421 (2019).

Dayal, Sankalp, et al., "Human Fall Detection in Indoor Environments Using Channel State Information of Wi-Fi Signals." (2016).

Bagci, Ibrahim Ethem, et al. "Using channel state information for tamper detection in the internet of things." Proceedings of the 31st Annual Computer Security Applications Conference (2015, pp. 131-140).

International Search Report and Written Opinion for PCT Application No. PCT/US2022/049273 (Dated Feb. 26, 2023).

Lei Xinyu et al. article entitled "The Insecurity of Home Digital Voice Assistants—Vulnerabilities, Attacks and Countermeasures" (dated May 30, 2018).

* cited by examiner

METHODS AND SYSTEMS FOR VOICE COMMAND TRANSACTION AUTHENTICATION

FIELD OF THE DISCLOSURE

The field of the disclosure relates generally to authenticating transactions, and, more particularly, to authenticating voice command transactions performed on a voice-activated digital assistant.

BACKGROUND OF THE DISCLOSURE

There is increasing use of connected devices, such as voice-activated digital assistants, for financial transactions by consumers. With the increase of voice and human interaction with these devices, there is a need for a secure/dedicated channel to prevent misuse and/or fraudulent use, such as man-in-the-middle attacks or electronic voice command injection, for example, in form of audio files. Current voice-activated digital assistants, for example, only provide single factor authentication via voice command. With a lack of voice verification, there is no level of differentiation for a command spoken live by a consumer or presented to the device as an audio file.

BRIEF DESCRIPTION OF THE DISCLOSURE

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a system is provided. The system includes a database, a memory device, and a processor. The processor is communicatively coupled to the database and the memory device. The memory device stores computer-executable instructions that, when executed by the processor, cause the processor to perform operations including receiving a voice command transaction request from a voice-activated computing device associated with a consumer. The processor also performs the operation of determining a first proximity score for a first consumer device. The first proximity score is based on a distance between the first consumer device and the voice-activated computing device. The processor further performs operations of detecting motion indicating the presence of a person proximate the voice-activated computing device based on wireless signal data received from the voice-activated computing device, and based on the motion detection, determining a motion score. Furthermore, the processor performs operations including receiving voice data from the voice-activated computing device and determining a voice differentiation score based on the voice data. Yet further, the processor performs an operation including determining a first rank score for the first consumer device. The first rank score is based on historical transaction data associated with the first consumer device. The processor analyzes, using a voice command authentication model, the first and second proximity scores, the motion score, the voice differentiation score, and the first and second rank scores. The voice command authentication model includes a machine learning program stored in the memory device. In addition, the processor determines, based on the analysis, an authentication score for the voice command transaction request.

In another aspect, a method is provided. The method includes receiving, by a virtual device authentication system, a voice command transaction request from a voice-activated computing device associated with a consumer. The method also includes determining, by the virtual device authentication system, a first proximity score for a first consumer device. The first proximity score is based on a distance between the first consumer device and the voice-activated computing device. The method includes detecting, by the virtual device authentication system, motion indicating the presence of a person proximate the voice-activated computing device based on wireless signal data received from the voice-activated computing device. Furthermore, the method includes determining, based on the motion detection, a motion score by the virtual device authentication system. Yet further, the method includes receiving, by the virtual device authentication system, voice data from the voice-activated computing device and determining a voice differentiation score based on the voice data. In addition, the method includes determining, by the virtual device authentication system, a first rank score for the first consumer device. The first rank score is based on historical transaction data associated with the first consumer device. The method includes analyzing, by the virtual device authentication system using a voice command authentication model, the first and second proximity scores, the motion score, the voice differentiation score, and the first and second rank scores. The voice command authentication model includes a machine learning program stored in a memory device. Additionally, the method includes determining, based on the analysis, an authentication score for the voice command transaction.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
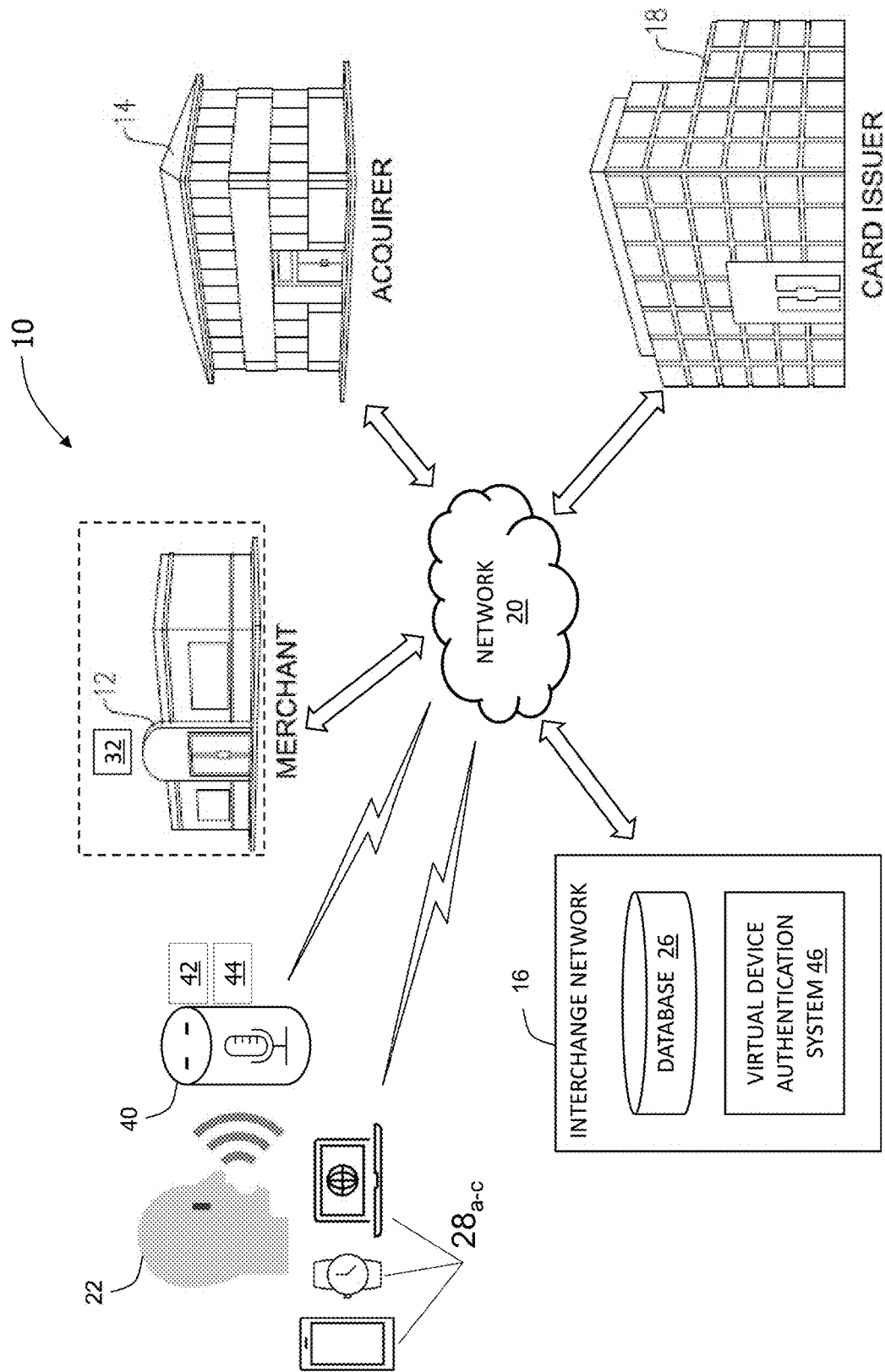
FIG. 1 is a block diagram of an example multi-party payment network system, in accordance with one embodiment of the present disclosure.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION OF THE DISCLOSURE

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled.

As used herein, the term "database" includes either a body of data, a relational database management system (RDBMS), or both. As used herein, a database includes, for example, and without limitation, a collection of data including hierarchical databases, relational databases, flat file databases, object-relational databases, object oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL® (PostgreSQL is a registered trademark of PostgreSQL Community Association of Canada, Toronto, Canada). However, any database may be used that enables the systems and methods to operate as described herein.

As used herein, the terms "payment card," "transaction card," and "financial transaction card," may include any suitable transaction card, such as a credit card, a debit card, a charge card, a membership card, a promotional card, an identification card, a prepaid card, a gift card, and/or any other card-type device that may hold payment account information. Each type of transaction card can be used as a method of payment for performing a transaction.

Furthermore, as used herein, the term "real-time" includes at least one of the times of occurrence of the associated events, the time of collection of data, the time to process the data, and the time of a system response to the events and the environment. For the activities and the events in the embodiments described herein as occurring in real-time, it should be assumed that they occur substantially instantaneously.

Payment Network Systems

FIG. 1 is a block diagram of an example multi-party payment network system 10. The payment network system 10 facilitates providing interchange network services offered by an interchange network 16. In addition, the payment network system 10 enables voice-initiated, contactless payment transactions, for example, by a voice-activated computing device 40 (such as a voice-activated digital assistant), in which merchants 12, acquirers 14, and/or issuers 18 do not need to have a one-to-one relationship. Although parts of the payment network system 10 are presented in one arrangement, other embodiments may include the same or different parts arranged otherwise, depending, for example, on authorization processes for purchase transactions, communication between computing devices, etc. As used herein, the term "interchange network" includes an electronic network that exchanges data relating to the value of card account sales and credits among the issuers 18 and the acquirers 14 (e.g., networks maintained, for example, by Mastercard®). (Mastercard is a registered trademark of Mastercard International Incorporated.)

In the exemplary embodiment, the voice-activated computing device 40 (e.g., a voice-activated digital assistant or other voice-activated computing device used by a consumer 22) includes a voice command interface (not labelled) that facilitates user interaction with the respective voice-activated computing device 40. For example, and without limitation, the voice command interface enables the consumer 22 to input information (e.g., via voice commands) to the voice-activated computing device 40, and the voice-activated computing device 40 to output information to the consumer 22 (e.g., via audio signals). The voice-activated computing device 40 includes, for example, a digital wallet application 42 (broadly, a digital wallet), which is linked to a digital wallet service and/or installed on the voice-activated computing device 40. It is contemplated that more than one digital wallet may be associated with the voice-activated computing device 40 and accessible by the voice command interface, where each digital wallet is associated with at least one financial institution (such as the issuer 18).

The voice-activated computing device 40 can be any computing device capable of interconnecting to the network 20, such as the Internet, including a voice-activated digital assistant, web-based device, smartphone, PDA, or other web-based connectable equipment. The voice-activated computing device 40 is preferably interconnected to the Internet through one or more interfaces including a wireless network, such as a wireless modem or router. In addition, in the example embodiment, the voice-activated computing device 40 is configured to communicate with other user computing devices and/or merchant point-of-sale (POS) systems 32 using various forms of communication including, for example, radio frequency communication, near field communication (NFC), network-based communication, and the like.

In the example embodiment, the payment network system 10 generally includes the merchants 12, the acquirers 14, the interchange network 16, and the issuers 18 coupled in communication via a network 20. The network 20 includes, for example and without limitation, one or more of a local area network (LAN), a wide area network (WAN) (e.g., the Internet, etc.), a mobile network, a virtual network, and/or any other suitable public and/or private network capable of facilitating communication among the merchants 12, the acquirers 14, the interchange network 16, and/or the issuers 18. In some embodiments, the network 20 may include more than one type of network, such as a private payment transaction network provided by the interchange network 16 to the acquirers 14 and/or the issuers 18, and, separately, the public Internet, which may facilitate communication between the merchants 12, the interchange network 16, the acquirers 14, and consumers 22, etc.

Embodiments described herein may relate to a transaction card system, such as a credit card payment system using the Mastercard interchange network. The Mastercard interchange network is a set of proprietary communications standards promulgated by Mastercard for the exchange of financial transaction data and the settlement of funds between financial institutions that are members of Mastercard. As used herein, financial transaction data includes a unique account number associated with an account holder using a payment card issued by an issuer, purchase data representing a purchase made by the consumer, including a type of merchant, amount of purchase, date of purchase, and other data, which may be transmitted between any parties of multi-party payment network system 10.

In a transaction card system as described herein, a financial institution called the "issuer" issues a payment card account (not shown) to a cardholder or consumer 22, who uses the payment card account to tender payment for a purchase from the merchant 12. In the example embodiment, the merchant 12 is typically associated with products, for example, and without limitation, goods and/or services, which are offered for sale and are sold to the consumers 22. The merchant 12 includes, for example, a physical location and/or a virtual location. A physical location includes, for example, a brick-and-mortar store, etc., and a virtual location includes, for example, an Internet-based store-front.

To accept payment with the payment card account, the merchant 12 must normally establish an account with a financial institution that is part of the payment network system 10. This financial institution is usually called the "merchant bank," the "acquiring bank," or the acquirer 14. When the consumer 22 provides payment for a purchase with the payment card account (e.g., via a payment card or digital wallet), the merchant 12 requests authorization from the acquirer 14 for the purchase amount. The request may be performed over the telephone but is usually performed using a point-of-sale (POS) terminal, such as the POS terminal 32, that wirelessly connects to the voice-activated computing device 40 and reads the consumer's payment account information, such as a payment token 44 (broadly, digital wallet data) tied to a primary account number (PAN), from a memory device of the voice-activated computing device 40 and communicates electronically with the transaction processing computers of the acquirer 14. Alternatively, the acquirer 14 may authorize a third party to perform transaction processing on its behalf. In this case, the POS terminal 32 will be configured to communicate with the third party. Such a third party is usually called a "merchant processor," an "acquiring processor," or a "third party processor."

Using the interchange network 16, computers of the acquirer 14 or merchant processor will communicate with computers of the issuer 18 to determine whether the consumer's account is in good standing and whether the purchase is covered by the consumer's available credit line. Based on these determinations, the request for authorization will be declined or accepted. If the request is accepted, an authorization code is issued to the merchant 12.

When a request for authorization is accepted, the available credit line of the consumer's account is decreased. Normally, a charge for a payment card transaction is not posted immediately to the consumer's account because bankcard associations, such as Mastercard, have promulgated rules that do not allow the merchant 12 to charge, or "capture," a transaction until the purchased goods are shipped or the purchased services are delivered. However, with respect to at least some debit card transactions, a charge may be posted at the time of the transaction. When the merchant 12 ships or delivers the goods or services, the merchant 12 captures the transaction by, for example, appropriate data entry procedures on the POS terminal 32. This may include bundling of approved transactions daily for standard retail purchases. If the consumer 22 cancels a transaction before it is captured, a "void" is generated. If the consumer 22 returns goods after the transaction has been captured, a "credit" is generated. The interchange network 16 and/or the issuer 18 stores the transaction data, such as, and without limitation, the PAN, a type of merchant, a merchant identifier, a location where the transaction was completed, an amount of purchase, a merchant category code, a date and time of the transaction, products purchased and related descriptions or identifiers, etc., in a transaction database 26.

After a purchase has been made, a clearing process occurs to transfer additional transaction data related to the purchase among the parties to the transaction, such as the acquirer 14, the interchange network 16, and the issuer 18. More specifically, during and/or after the clearing process, additional data, such as a time of purchase, a merchant name, a type of merchant, purchase information, consumer account information, a type of transaction, itinerary information, information regarding the purchased item and/or service, and/or other suitable information, is associated with a transaction and transmitted between the parties to the transaction as transaction data, and may be stored by any of the parties to the transaction.

After a transaction is authorized and cleared, the transaction is settled among the merchant 12, the acquirer 14, and the issuer 18. Settlement refers to the transfer of financial data or funds among the merchant 12, the acquirer 14, and the issuer 18 related to the transaction. Usually, transactions are captured and accumulated into a "batch," which is settled as a group. More specifically, a transaction is typically settled between the issuer 18 and the interchange network 16, and then between the interchange network 16 and the acquirer 14, and then between the acquirer 14 and the merchant 12. It should be appreciated that more or less information related to transactions, as part of either authorization, clearing, and/or settlement, may be included in the transaction data and stored within the transaction database 26, at the merchant 12, the acquirer 14, the payment network 16, and/or the issuer 18. Further, transaction data, unrelated to a particular payment account, may be collected by a variety of techniques, and similarly stored within the transaction database 26.

In some embodiments, consumers 22 involved in the transactions described herein are prompted to agree to legal terms associated with their payment accounts, for example, during enrollment in such payment accounts, etc. As such, the consumer 22 may voluntarily agree to allow the merchants 12, the issuers 18, the interchange network 16, etc., to utilize data collected during enrollment and/or collected relating to processing the transactions, subsequently for one or more of the purposes described herein.

As described above, the payment token 44 and/or the consumer's PAN is passed from the voice-activated computing device 40 to the merchant 12, for example, via the POS terminal 32. In many instances, the payment token 44 and/or the PAN and the associated expiry date may be saved to various databases, such as the database 26. Contactless digital wallet transactions are generally performed in EMV mode. Contactless EMV mode is more secure than traditional mag-stripe mode (e.g., for use with physical payment cards) and includes a unique cryptogram for the specific transaction. Digital wallet transactions initiated by the voice-activated computing device 40 at the POS terminal 32 typically include tokenized account data (such data including, for example, the PAN and the expiry date). As a result, the possibility of the actual PAN and expiry date of a payment card account to be exposed to fraudsters, for example, via a data breach, is substantially decreased.

Thus, referring back to FIG. 1, the interchange network 16 includes a virtual device authentication system 46 (e.g., a computing system) that is configured to analyze various data associated with the consumer 22, such as voice and location data, and the voice-activated computing device 40, such as Wi-Fi and location data, to authenticate a user of the voice-activated computing device 40 before performing a transaction. In particular, in the example embodiment, the virtual device authentication system 46 is a specially programmed computer system that enables the interchange network 16 to implement an automated process to identify and authenticate the consumer 22 who may be performing a transaction via a voice command, and as such, who may be unable to be authenticated via a typical authentication process.

In the example embodiment, the virtual device authentication system 46 is programmed to communicate with one or more consumer devices, such as the voice-activated computing device 40 and/or consumer devices $28_{a-c}$, to receive account registration information (not shown in FIG. 1) to facilitate establishing an account that is not already registered with the virtual device authentication system 46. In particular, the account registration process creates a consumer account and associated transaction credentials for use with the virtual device authentication system 46 and/or the digital wallet application 42. The consumer 22 enters the account registration information for transmission to the virtual device authentication system 46. The account registration information may include, for example, and without limitation, payment account data (e.g., the PAN, a virtual payment number, limited use number, etc.), identification data of the voice-activated computing device 40 (e.g., an Electronic Serial Number (ESN) and the like), and/or associated consumer device data associated with other devices (such as the consumer devices $28_{a-c}$) of the consumer 22, as described herein. Furthermore, the account registration information may include consumer consent for the sharing of voice data and location data by the voice-activated computing device 40. There is preferably no sharing of data from the voice-activated computing device 40 without the consumer's consent. Account configuration and consumer opt-in may be carried out via the virtual device authentication computing system 46. The account registration information may be stored in a database, such as the database 26. The virtual device authentication system 46 generates a consumer account from the account registration information for the consumer 22.

To authenticate the consumer 22, in the example embodiment, the virtual device authentication system 46 is programmed to receive Wi-Fi based real time motion detection information from the voice-activated computing device 40, location or geolocation data from one or more of the consumer devices $28_{a-c}$, voice data from the voice-activated computing device 40, and historical transaction data associated with the consumer devices $28_{a-c}$. As used herein, the consumer devices $28_{a-c}$ include, for example, the consumer's other electronic payment devices, such as a smartphone, smartwatch, laptop, table computing device, computer, and the like, used to perform electronic transactions, such as financial transactions. Each of the data are used to determine a confidence score. The scores are combined and compared to a predetermined threshold and/or one or more rules to determine whether to authorize a voice command transaction request or decline the transaction.

While only one merchant 12, acquirer 14, interchange network 16, and issuer 18 are shown in FIG. 1 (for ease of reference), it should be appreciated that a variety of other embodiments may include multiple ones of these parties in various combinations.

Figure 2:
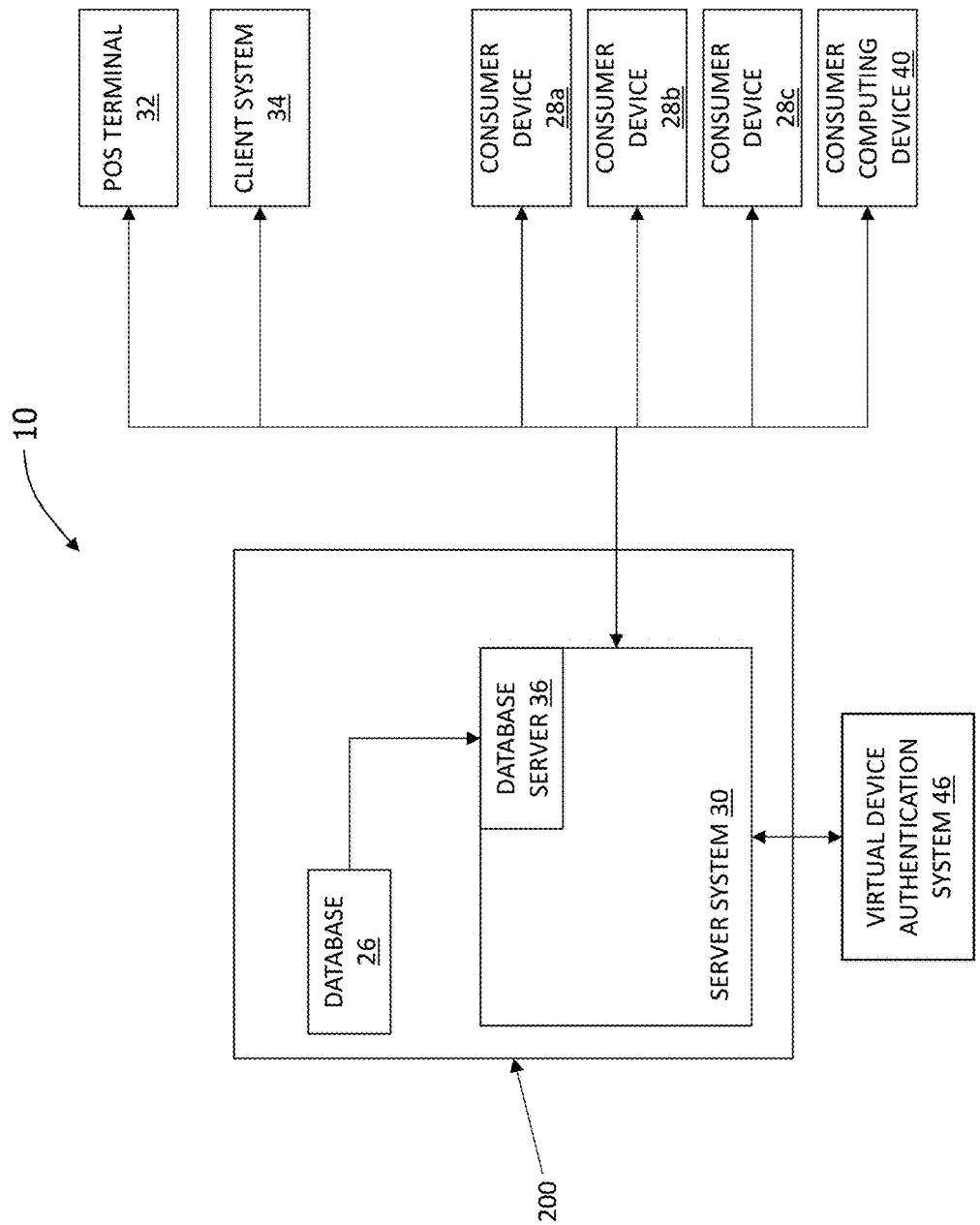
FIG. 2 is a simplified block diagram of an example payment network system, such as the payment network system shown in FIG. 1, including a plurality of computing devices and a virtual device authentication system.

FIG. 2 is a simplified block diagram of an example payment network system, such as the payment network system 10, including a plurality of computing devices and the virtual device authentication system 46. In the example embodiment, the plurality of computing devices include, for example, a processing system 200 having a server system 30, a POS terminal 32 located at a merchant, such as the merchant 12 (shown in FIG. 1), a client system 34 (e.g., contactless ATMs, computers, etc.) associated with a merchant, merchant bank, payment network, and/or issuer bank (e.g., the issuer 18 (shown in FIG. 1)), the consumer devices $28_{a-c}$, and the computing device 40 associated with the consumer 22 (shown in FIG. 1). In one embodiment, the payment network system 10 implements a process for authenticating the consumer 22 during a voice command transaction initiated by the consumer 22.

In the exemplary embodiment, as described above, the processing system 200 includes the server system 30 of, for example, the interchange network 16 (shown in FIG. 1) coupled in communication with the POS terminal 32, the client system 34 (also includes client sub-systems), the consumer devices $28_{a-c}$, and the voice-activated computing device 40. In one embodiment, the client system 34 and the consumer devices $28_{a-c}$ are computers that include a web browser, such that the server system 30 is accessible to the client system 34 and the consumer devices $28_{a-c}$ using the Internet. The client system 34, the consumer devices $28_{a-c}$, and the voice-activated computing device 40 are interconnected to the Internet through any one or more of many interfaces including, for example, a Wi-Fi network, such as a LAN or WAN, Wi-Fi modems or routers, and/or special high-speed Integrated Services Digital Network (ISDN) lines. The client system 34 and the consumer devices $28_{a-c}$ can each be any device capable of interconnecting to the Internet, including an Internet connected phone, a PDA, or any other suitable web-based connectable equipment. As described herein, the voice-activated computing device 40 can be a voice-activated digital assistant.

The POS terminal 32 may be connected to the client system 34 or may be connected to the server system 30. The POS terminal 32 may be interconnected to the Internet (or any other network that allows the POS terminal 32 to communicate as described herein) through any one or more of many possible interfaces including a network, such as a local area network (LAN) or a wide area network (WAN), dial-in-connections, cable modems, wireless modems, and special high-speed ISDN lines. The POS terminal 32 is any device capable of interconnecting to the Internet and including an input device capable of reading information from a consumer's financial payment card. In some embodiments, the POS terminal 32 may be a consumer's computing device, such as when conducting an online purchase through the Internet. As used herein, the terms POS device, POS terminal, and point of interaction device are used broadly, generally, and interchangeably to refer to any device with which the consumer 22 interacts with to complete a digital wallet transaction.

A database server 36 is connected to the database 26. The database 36 is configured to store information on a variety of matters, including, for example, voice data, location data, consumer profiles/accounts, consumer consents data, tokenization data corresponding to the consumer 22, identification data associated with the consumer devices $28_{a-c}$ and/or the voice-activated computing device 40, and the like, as is described herein in greater detail. In one embodiment, the database 26 is a centralized database stored on the server system 30. The database 26 may be accessed by potential users at the client system 34 by logging onto the server system 30 through the client system 34. In an alternative embodiment, the database 26 is stored remotely from the server system 30 and may be a distributed or non-centralized database.

In one example embodiment, the database 26 may include a single database having separated sections or partitions or may include multiple databases, each being separate from each other. The database 26 may store transaction data generated as part of sales activities conducted over the processing network, including data relating to merchants, account holders or customers, issuers, acquirers, savings amounts, savings account information, and/or purchases made. The database 26 may also store account data including at least one of a consumer name, a consumer address, an account number, and other account identifiers that relate the voice-activated computing device 40 to the consumer 22. The database 26 may also store merchant data including a merchant identifier that identifies each merchant registered to use the network. The merchant data may also include instructions for authenticating consumers and performing and settling transactions, including merchant bank account information. The database 26 may also store authorization request data, such as, motion data, location data, voice data, identifiers, etc.

In the exemplary embodiment, the client system 34 may be associated with the acquirer 14 (shown in FIG. 1) while another client system 34 may be associated with the issuer 18 (shown in FIG. 1). The POS terminal 32 may be associated with the merchant 12 (shown in FIG. 1) or may be a computer system used by the consumer 22 (shown in FIG. 1) when making a voice-initiated on-line purchase or payment. The server system 30 may be associated with the interchange network 16 or another payment processor. In the example embodiment, the server system 30 is associated with a financial transaction processing network, such as the interchange network 16, and may be referred to as an interchange computer system. The server system 30 may be used for processing transaction data. In addition, the client systems 34 and the POS terminal 32 may include a computer system associated with at least one of a merchant, an online bank, a bill payment outsourcer, an acquirer bank, an acquirer processor, an issuer bank associated with a payment card, an issuer processor, a remote payment processing system, a third-party aggregator, and/or a biller.

In the example embodiment, the processing system 200 is in communication with the virtual device authentication system 46. The virtual device authentication system 46 may be associated with the interchange network 16 or with an outside third party in a contractual relationship with the interchange network 16. In some embodiments, the virtual device authentication system 46 is in communication with the server system 30 and may be a component of the server system 30 or a separate computing device. In the example embodiment, the virtual device authentication system 46 processes transaction requests and authenticates a consumer based on Wi-Fi based real time motion detection data received from the voice-activated computing device 40, location data received from one or more of the consumer devices $28_{a-c}$, voice data received from the voice-activated computing device 40, and historical transaction data associated with the consumer devices $28_{a-c}$ (retrieved, for example, from the database 26). As such, the virtual device authentication system 46 is configured to receive/provide various data from/to one or more parties involved in the authentication request. It is noted that the payment network 10 may include more, fewer, or alternative components and/or perform more, fewer, or alternative actions, including those discussed elsewhere herein.

Exemplary Computer Systems

Figure 3:
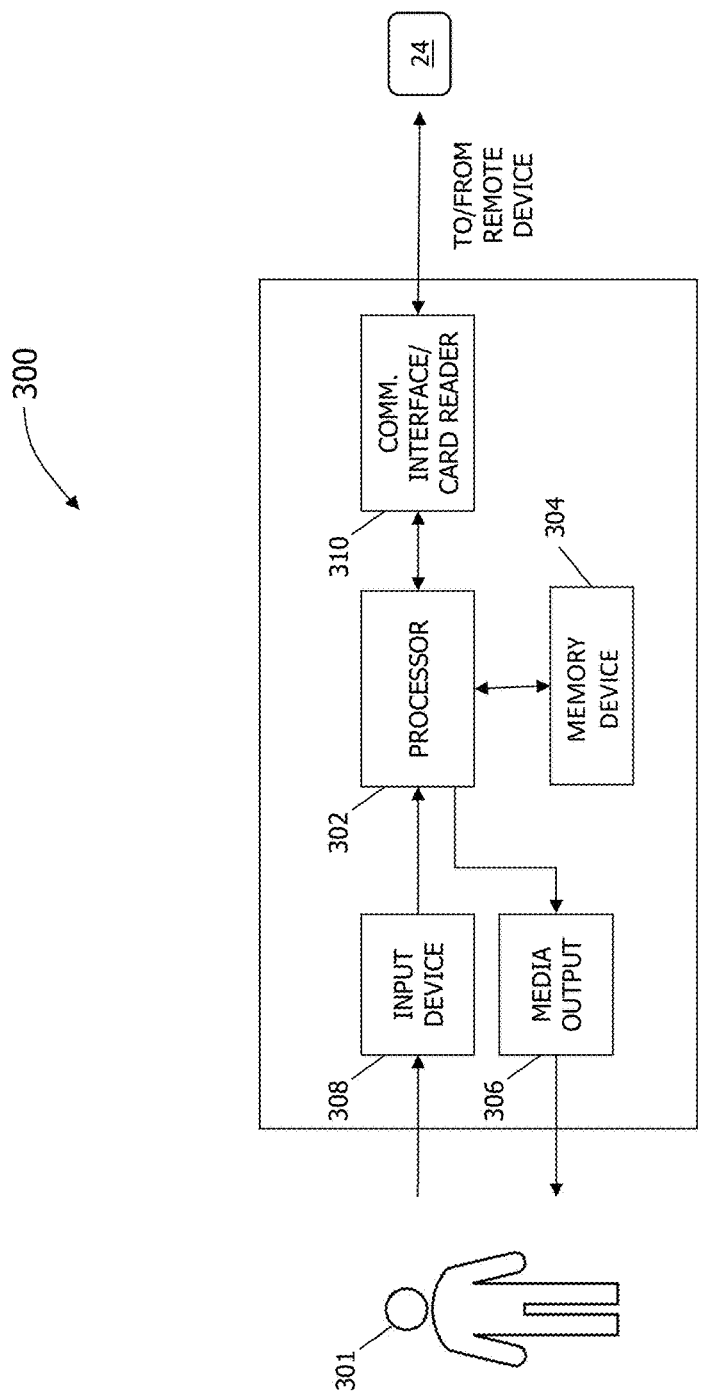
FIG. 3 is an example configuration of a computing system for use in the payment network system shown in FIG. 1.

FIG. 3 is an example configuration of a computing system 300 operated by a user 301. In some embodiments, the computing system 300 is the voice-activated computing device 40, a merchant POS terminal 32, a client system 34, and/or a contactless ATM, for example. In the example embodiment, the computing system 300 includes a processor 302 for executing instructions. In some embodiments, executable instructions are stored in a memory device 304. The processor 302 includes one or more processing units, for example, in a multi-core processor configuration. The memory device 304 is any device allowing information such as executable instructions and/or written works to be stored and retrieved. The memory device 304 includes one or more computer readable media.

In the example embodiment, the processor 302 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

Because the computing system 300 may be widely deployed, it may be impractical to manually update software for each computing system 300. Therefore, the system 10 may, in some embodiments, provide a mechanism for automatically updating the software on the computing system 300. For example, an updating mechanism may be used to automatically update any number of components and their drivers, both network and non-network components, including system level (OS) software components. In some embodiments, the components of the computing system 300 are dynamically loadable and unloadable; thus, they may be replaced in operation without having to reboot the OS.

The computing system 300 also includes at least one media output component 306 for presenting information to the user 301. The media output component 306 is any component capable of conveying information to the user 301. In some embodiments, the media output component 306 includes an output adapter such as an audio adapter and/or a video adapter. An output adapter is operatively coupled to the processor 302 and operatively connectable to an output device, such as; (i) an audio output device including, for example, a speaker or headphones; and/or (ii) a display device including, for example, a liquid crystal display (LCD), organic light emitting diode (OLED) display, or "electronic ink" display.

In some embodiments, the computing system 300 includes an input device 308 for receiving input from the user 301. The input device 308 may include, for example, an audio input device, such as a microphone. In some embodiments, the input device 308 may include, for example, one or more of a touch sensitive panel, a touch pad, a touch screen, a stylus, a position detector, a keyboard, a pointing device, and a mouse. A single component, such as a touch screen, may function as both an output device of the media output component 306 and the input device 308.

The computing system 300 may also include a communication interface 310, which is communicatively connectable to a remote device such as a wireless modem/router 24 (broadly, a wireless access point), the network 20 (shown in FIG. 1), and/or the server system 30 (shown in FIG. 2). The communication interface 310 may include, for example, a wireless or wired network adapter or a wireless data transceiver for use with Wi-Fi (e.g., implementing the Institute of Electrical and Electronics/IEEE 802.11 family of standards), Bluetooth communication, radio frequency (RF) communication, near field communication (NFC), and/or with a mobile phone network, Global System for Mobile communications (GSM), 3G, or other mobile data network, and/or Worldwide Interoperability for Microwave Access (WiMax) and the like.

In one embodiment, stored in the memory device 304 are, for example, computer readable instructions for providing a voice command interface to the user 301 via the media output component 306 and, optionally, receiving and processing input from the input device 308. A voice command interface may include, among other possibilities, the digital wallet application 42 (shown in FIG. 1). The digital wallet application 42 allows the consumer 22 to interact, for example, with the POS terminal 32 (shown in FIG. 2) and/or the merchant 12 to perform electronic transactions.

Figure 4:
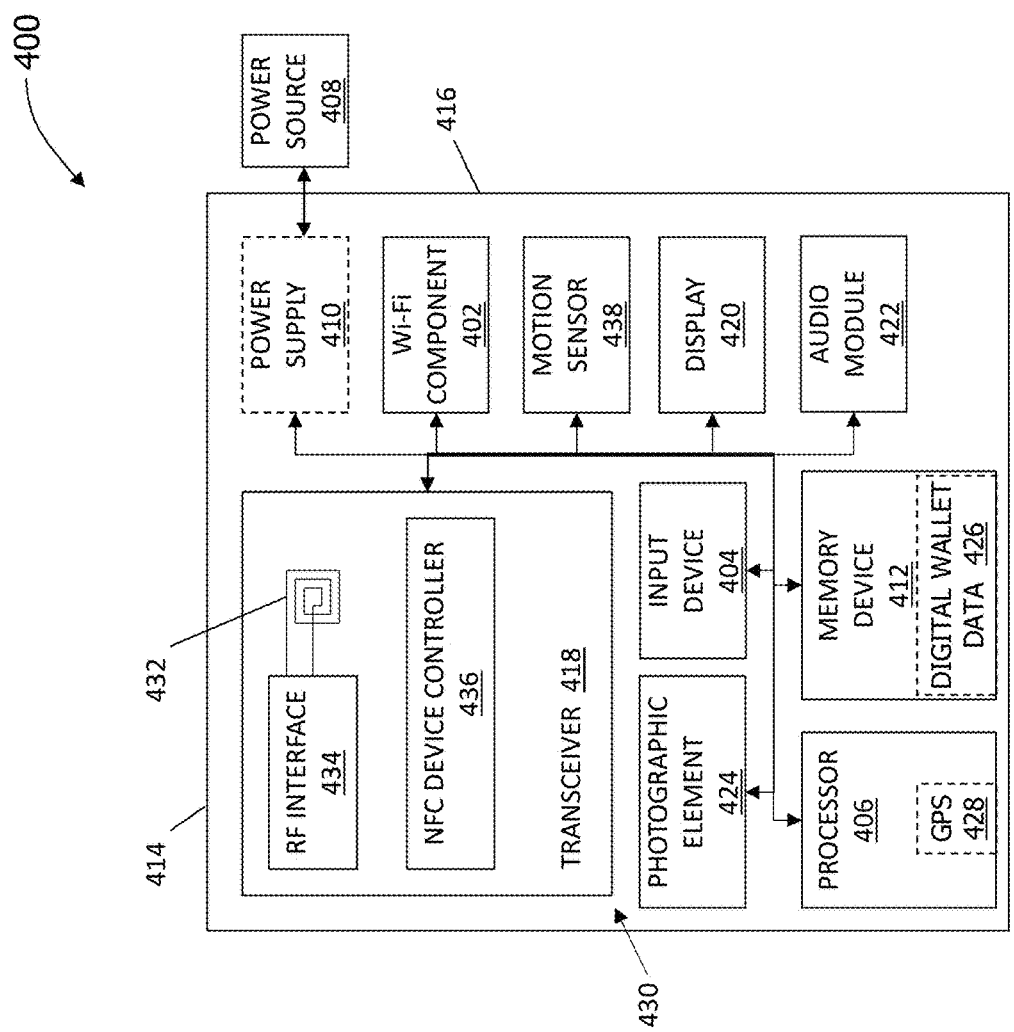
FIG. 4 is an example configuration of a user computing system for use in the payment network system shown in FIG. 1.

FIG. 4 is an example configuration of a user computing system 400, such as a consumer device $28_{a-c}$ (shown in FIG. 1), that may be operated by a user, such as the consumer 22 (shown in FIG. 1). In the exemplary embodiment, the computing system 400 is a computing device configured to connect to one or more of the merchant 12, the interchange network 16, the issuer 18, the network 20, a POS terminal 32, and any other computing devices, such as other consumer computing devices (not shown).

In the exemplary embodiment, the computing system 400 generally includes a processor 406, a memory device 412, a transceiver 418 (or a wireless communication device), and a photographic element 424. In addition, the computing system 400 includes an integrated Wi-Fi component 402 (e.g., implementing the Institute of Electrical and Electronics/ IEEE 802.11 family of standards), an input device 404, a display 420, and an audio module 422. Moreover, the computing system 400 optionally includes an internal power supply 410 (e.g., a battery or other self-contained power source) to receive power, or alternatively, in some embodiments, the computing system 400 may include an external power source 408. Optionally, the computing system 400 may include a motion sensor 438.

The processor 406 includes one or more processing units (e.g., in a multi-core configuration) specially programmed for executing computer readable instructions. The instructions may be executed within a variety of different operating systems (OS) on the consumer device $28_{a-c}$, such as UNIX, LINUX, Microsoft Windows®, etc. More specifically, the instructions may cause various data manipulations on data stored in the memory device 412 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C #, C++, Java, or other suitable programming languages, etc.). The memory device 412 is any device allowing information such as digital wallet data 426, the executable instructions, and/or written works to be stored and retrieved. The memory device 412 includes one or more computer readable media.

In the example embodiment, the processor 406 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

Because the computing system 400 may be widely deployed, it may be impractical to manually update software for each computing system 400. Therefore, the network system 100 provides a mechanism for automatically updating the software on the computing system 400. For example, an updating mechanism may be used to automatically update any number of components and their drivers, both network and non-network components, including system level (OS) software components. In some embodiments, the computing system 400 components are dynamically loadable and unloadable; thus, they may be replaced in operation without having to reboot the OS.

A location of the computing system 400 can be obtained through conventional methods, such as a location service (e.g., global positioning system (GPS) service) in the computing system 400, "ping" data that includes geotemporal data, from cell location register information held by a telecommunications provider to which the computing system 400 is connected, and the like. For example, in one suitable embodiment, an optional GPS chip 428 can be part of or separate from the processor 406 to enable the location of the computing system 400 to be determined.

Stored in the memory device 412 are, for example, computer readable instructions for providing a user interface to the user via the display 420 and, optionally, receiving and processing input from the input device 404. A user interface may include, among other possibilities, a web browser and a client application. Web browsers enable users, such as the consumer 22, to display and interact with media and other information typically embedded on a web page or a website.

A client application allows the consumer 22 to interact with a server application, for example, associated with a merchant.

The photographic element 424 may include a camera or other optical sensor and lens combination capable of generating a video signal and capturing an image, iris scan, and the like. In various embodiments, the photographic element 424 may be integrated in a housing or body, such as a housing 414, of the computing system 400. When the photographic element 424 captures an image or otherwise generates image data (e.g., video data), the photographic element 424 may store the image data in a data file, either in a raw or compressed format, in the memory device 412.

In some embodiments, the motion sensor 438 may include one or more sensor elements that facilitate detecting a person's presence. For example, if the computing system 400 is operating as a consumer device $28_{a-c}$, the motion sensor 438 detects when the consumer 22 moves or raises the consumer device. Upon detection of such motion, the photographic element 424 may begin capturing images (e.g., still or video images), the transceiver 418 may be activated, and/or the audio module 422 may begin capturing audio. The motion sensor 438 may be operatively coupled to the photographic element 424 such that the consumer's presence may be detected by detecting motion using the photographic element 424. The motion sensor 438 may include, for example, and without limitation, sensor elements such as a passive infrared sensor, an ambient light sensor, and the like.

In the example embodiment, the display 420 can include, for example, and without limitation, a liquid crystal display (LCD), an organic light emitting diode (OLED) display, or an "electronic ink" display. In some embodiments, a single component such as a touch screen may function as both an output device (e.g., the display 420) and the input device 404. As such, the display 420 may optionally include a touch controller for support of touch capability. In such embodiments, the computing system 400 may detect a user's presence by detecting that the user has touched the display 420 of the computing system 400.

The audio module 422 may include, for example, and without limitation, a speaker and related components capable of broadcasting streaming and/or recorded audio and may also include a microphone. The microphone facilitates capturing audio through the computing system 400.

In the example embodiment, the computing system 400 includes the housing 414 at least partly (and more preferably, at least substantially or entirely) enclosing the components described above. In addition, the computing system 400 includes circuitry 430 configured to communicate with the network 20 (shown in FIG. 1) and/or other computing devices (e.g., other user computing devices $28_{a-c}$, the POS terminal 32, the interchange network 16, etc.). The circuitry 430 may include, for example, leads, connectors, NFC-enabled circuitry, Wi-Fi-enabled circuitry, and photographic element circuitry. The housing 414 is preferably configured to seal the circuitry 430, which is susceptible to degradation from the ambient environment. In one embodiment, the circuitry 430 is hermetically sealed in the housing 414. For example, in one embodiment, the circuitry 430 is completely and permanently encased within the housing 414. In other words, the housing 414 and the circuitry 430 are intended to remain as a single, inseparable unit throughout the life of the computing system 400. It is understood that the housing 414 can be formed separately from the circuitry 430 and that the circuitry 430 can be placed into and sealed within the housing 414 in a separate operation. It is also understood that the housing 414 can be oversized with respect to the circuitry 430 so that the circuitry 430 can be placed loosely into the housing 414. In another embodiment, the circuitry 430 can be selectively, sealingly enclosed within the housing 414, where the housing 414 includes a closure 416 removably attached to a body of the housing 414.

The housing 414 is fabricated from a suitably selected material that facilitates inhibiting the effect the material has on the signal being emitted from, for example, the transceiver 418 and/or the Wi-Fi component 402 and passing through the housing material. For example, and without limitation, suitable materials from which the housing 414 may be fabricated include polyethylene, propylene, isoprene, and butylenes (i.e., polyolefins). In other embodiments, the housing 414 is fabricated from any material that enables the computing system 400 to function as described herein, such as metals, etc.

In one embodiment, the transceiver 418 includes an antenna 432. The antenna 432 includes a looped wire configured to transmit radio signals when current flows through the looped wire. The antenna 432 is any size, shape, and configuration that is suitable for transmitting signals as described herein. For example, the antenna 432 is a tuned circuit configured to transmit radio signals in any radio-based communication system including, but not limited to, Radio Frequency Identification (RFID), Wireless Local Area Network (WLAN), and Wireless Personal Area Network (WPAN) systems. In the example embodiment, the antenna 432 generates a magnetic field when it vibrates at a selected frequency. Specifically, the antenna 432 is configured to vibrate at a frequency of about 13.56 MHz, which is suitable for use in a near field communication (NFC) system.

In the example embodiment, the antenna 432 transmits radio signals to and receives radio signals from other wireless-enabled computing devices, for example, another user computing device, merchant POS terminal 32, and/or any other components used in wireless systems. In NFC systems, for example, at least one NFC component generates a magnetic field to inductively transfer currents and, thereby, exchange signals and information with other NFC components positioned within the magnetic field. In one example embodiment, the antenna 432 functions as an NFC component to send and receive signals. The antenna 432 is configured to transmit radio signals to NFC components positioned within the magnetic field of the antenna 432, such as when the consumer device $28_{a-c}$ is located within a predetermined distance of the POS terminal 32. Therefore, the magnetic field generated by the antenna 432 defines the active range of the computing system 400. Additionally, the antenna 432 receives radio signals from NFC components when the antenna 432 is positioned within the magnetic field of the NFC components.

The transceiver 418 also includes a radio frequency (RF) interface 434 and an NFC device controller 436. The RF interface 434 and the NFC device controller 436 are powered by the power source 408, and in some embodiments, the internal power supply 410 and/or the display 420. In addition, the processor 406 and the memory device 412 are powered in the same manner. The RF interface 434 is configured to receive and transmit RF signals through the antenna 432. The NFC device controller 436 is configured to process the received RF signals and to generate signals to be transmitted by the RF interface 434. The memory device 412 is configured to store data associated with transmitting and receiving the RF signals. The NFC device controller 436 is coupled in communication with the processor 406.

In some embodiments, the computing system 400 may be connected to one or more peripheral devices (not shown).

That is, the computing system 400 may communicate various data with one or more peripheral devices. For example, the computing system 400 may communicate with one or more peripheral devices through the Wi-Fi component 402, the transceiver 418, or other suitable means.

Figure 5:
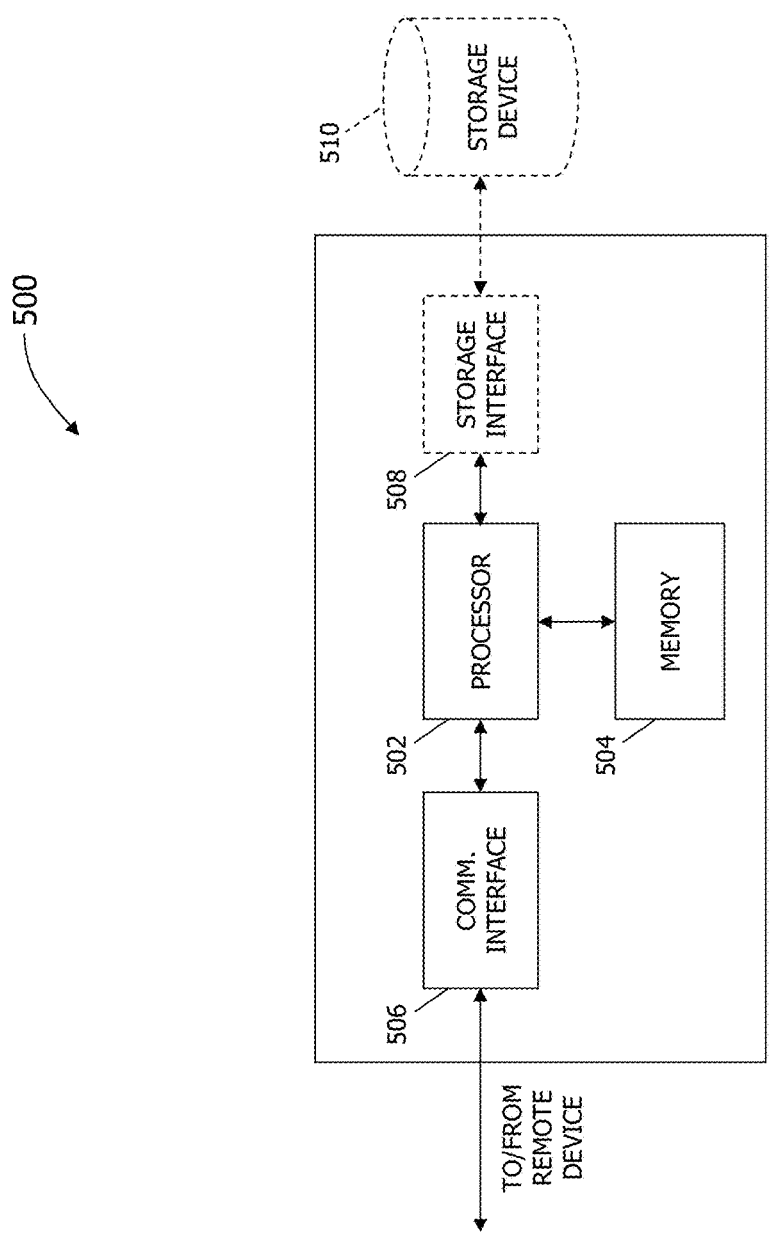
FIG. 5 is an example configuration of a server system for use in the payment network system shown in FIG. 1.

FIG. 5 is an example configuration of a server system 500, such as the server system 30 (shown in FIG. 2). The server system 500 includes, but is not limited to, the transaction database 26 (shown in FIG. 1) and the virtual device authentication system 46 (shown in FIG. 1). In the example embodiment, the server system 500 includes a processor 502 for executing instructions. The instructions may be stored in a memory area 504, for example. The processor 502 includes one or more processing units (e.g., in a multi-core configuration) for executing the instructions. The instructions may be executed within a variety of different operating systems on the server system 500, such as UNIX, LINUX, Microsoft Windows®, etc. More specifically, the instructions may cause various data manipulations on data stored in a storage device 510 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C #, C++, Java, or other suitable programming languages, etc.). In the example embodiment, the processor 502 may be implemented as one or more cryptographic processors, as described above with respect to the user system 500.

The processor 502 is operatively coupled to a communication interface 506 such that the server system 500 can communicate with a remote device such as a computing system 300 (shown in FIG. 3), a user computing system 400 (shown in FIG. 4), and/or another server system. For example, the communication interface 506 may receive communications from a POS terminal 32, a client system 34, one of the consumer devices $28_{a-c}$, and/or a voice-activated computing device 40 via the Internet.

The processor 502 is operatively coupled to the storage device 510. The storage device 510 is any computer-operated hardware suitable for storing and/or retrieving data. In some embodiments, the storage device 510 is integrated in the server system 500. In other embodiments, the storage device 510 is external to the server system 500 and is similar to the transaction database 26. For example, the server system 500 may include one or more hard disk drives as the storage device 510. In other embodiments, the storage device 510 is external to the server system 500 and may be accessed by a plurality of server systems 500. For example, the storage device 510 may include multiple storage units such as hard disks or solid-state disks in a redundant array of inexpensive disks (RAID) configuration. The storage device 510 may include a storage area network (SAN) and/or a network attached storage (NAS) system.

In some embodiments, the processor 502 is operatively coupled to the storage device 510 via a storage interface 508. The storage interface 508 is any component capable of providing the processor 502 with access to the storage device 510. The storage interface 508 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 502 with access to the storage device 510.

The memory area 504 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

Exemplary Computer-Implemented Methods

Figure 6:
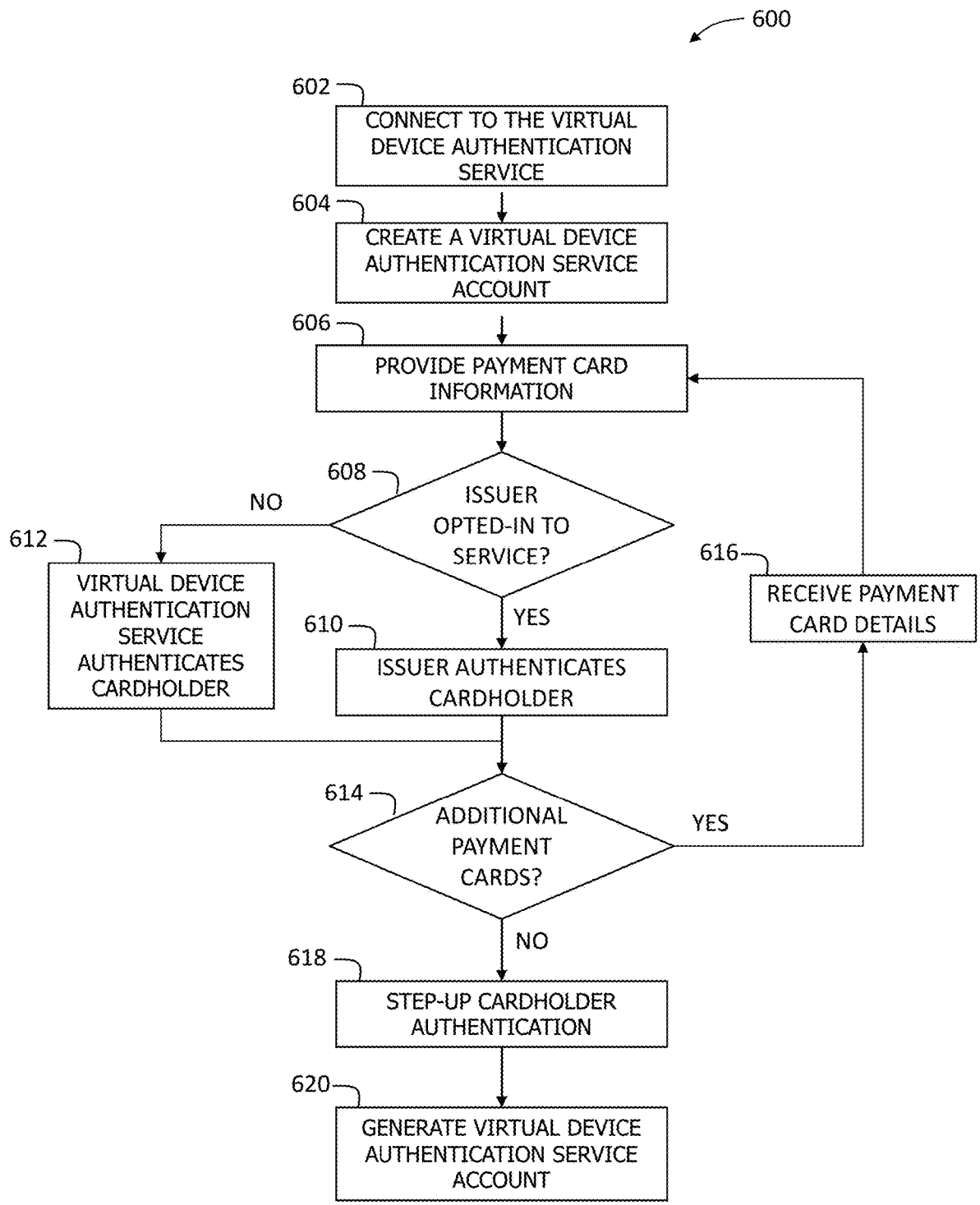
FIG. 6 is a flowchart illustrating an exemplary computer-implemented method for registering a consumer for a virtual device authentication service, in accordance with one embodiment of the present disclosure.

FIG. 6 is a flowchart illustrating an exemplary computer-implemented method 600 for registering a consumer for a virtual device authentication service, in accordance with one embodiment of the present disclosure. The operations described herein may be performed in the order shown in FIG. 6 or may be performed in a different order. Furthermore, some operations may be performed concurrently as opposed to sequentially. In addition, some operations may be optional.

The computer-implemented method 600 is described below, for ease of reference, as being executed by exemplary devices and components introduced with the embodiments illustrated in FIGS. 1-5. In one embodiment, the method 600 may be implemented by the payment card network system 10 (shown in FIG. 1). In the exemplary embodiment, the method 600 relates to the receiving of consumer registration information from the consumer 22, for example, via a consumer device $28_{a-c}$, (shown in FIG. 1) upon registration for the virtual device authentication service. While operations within the method 600 are described below regarding a consumer device $28_{a-c}$, the method 600 may be implemented on other such computing devices and/or systems through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

Referring to operation 602, the consumer 22 connects to the virtual device authentication system 46, for example, via a web browser. At operation 604, the consumer 22 is presented with an option to create a virtual device authentication service account. For example, the consumer 22 enrolls for the virtual device authentication service via the virtual device authentication service. Such enrollment is preferably accomplished through a suitable webpage of the virtual device authentication system 46 using, for example, a consumer device $28_{a-c}$. It should be understood that the consumer 22 may register with the virtual device authentication service in any of several ways, including utilizing the consumer device $28_{a-c}$ to access the virtual device authentication system 46 via the Internet and providing required account information.

During consumer enrollment, the consumer 22 may provide enrollment data including basic information about himself or herself (e.g., name, address, phone number, etc.), and, in some embodiments, provide information regarding the customer's computing devices, such as the voice-activated computing device 40 and the consumer devices $28_{a-c}$ (for example, by providing an electronic identifier and/or a mobile telephone number and/or other device identifier). In addition, the physical location (such as an address or geo-location) for the voice-activated computing device 40 is provided as part of the enrollment data. This enables the virtual device authentication system 46 to match a location of the consumer 22, for example, via location data of one or more of the consumer devices 28$_{a-c}$, to the location of the voice-activated computing device 40 during a voice command transaction.

Furthermore, the enrollment data or account registration information may include a voice recording, which may be stored as sample voice data. This enables the virtual device authentication system 46 to match a consumer's voice command to sample voice data to authenticate the consumer. The enrollment data may also include consumer consent for the sharing of voice data and location data by the voice-activated computing device 40. There is preferably no sharing of data from the voice-activated computing device 40 without the consumer's clear consent.

The consumer 22 may provide information and/or preferences concerning one or more family members, such as a spouse and/or children to form a "Household" virtual device authentication service account. It is noted that the virtual device authentication service account can be linked to other Mastercard services if the consumer 22 is already signed up for other unrelated services. In some embodiments, the information obtained from the consumer 22 during the enrollment process includes product and/or service preferences, and/or other information.

At operation 606, the consumer 22 may also provide information concerning his or her payment card, e.g., bank credit card account, debit card account, loyalty card account, and/or gift card issued to or held by him or her. At operation 608, the virtual device authentication system 46 determines whether the issuer 18 of the payment card has opted-in to the virtual device authentication service. If the issuer 18 chooses to opt-in to the virtual device authentication service, at operation 610 the issuer 18 authenticates the consumer 22 in real-time. For example, and without limitation, the issuer 18 may authenticate the consumer 22 via a one-time code sent to the consumer 22 via Short Message Service (SMS), e-mail, through an issuer mobile application, through a call center communication, and the like. In the exemplary embodiment, issuer authentication is the preferred method for authenticating the consumer 22, as the issuer 18 and the consumer 22 have a direct relationship.

If the issuer 18 is not opted-in to the virtual device authentication service and therefore does not participate in the enrollment process, at operation 612, the virtual device authentication system 46 authenticates the consumer 22. For example, and without limitation, the consumer 22 may be asked to input a string of characters indicating a code printed on the signature panel of the consumer's payment card. For example, the signature panel code may be a card verification code (CVC) value. The values entered by the consumer 22 may be used by the virtual device authentication system 46 to authenticate the consumer 22 prior to setting up the virtual device authentication service account and associating the consumer 22 and the consumer's payment card with the account. For example, the virtual device authentication system 46 compares the entered values to the values associated with the payment card stored in a database (e.g., the database 26 shown in FIG. 1). If the entered values match the stored values, the consumer 22 is authenticated. While this method allows the consumer to be authenticated, it may not be as strong of an authentication or verification available through the issuer 18. As such, subsequent voice command transactions performed by the consumer 22 in the virtual device authentication service may not be afforded the highest confidence level.

Optionally, the method 600 may include an additional operation for authenticating the consumer 22 offline. This may facilitate increasing the confidence level of the consumer's voice command transactions received by the virtual device authentication service (particularly if the issuer 18 is not opted-in to the service). For example, and without limitation, the virtual device authentication system 46 may provide an offline PIN to the consumer 22 via mail.

At operation 614, the virtual device authentication system 46 asks the consumer 22 whether the consumer has additional payment cards he or she wishes to associate with the consumer's virtual device authentication service account. If the consumer has additional payment cards to enter, at operation 616, the virtual device authentication system 46 receives the payment card details from the consumer 22 and returns to operation 606. If the consumer does not have any additional payment cards to enter, the method continues to operation 618.

At operation 618, in some embodiments, the virtual device authentication system 46 requests that the consumer 22 set up a step-up authentication method, i.e., two-factor authentication. For example, and without limitation, in one embodiment, the consumer 22 is requested to establish account access credentials, e.g., to select a username and password or PIN (personal identification number) to be used for security purposes, and/or for use by the consumer 22 to login and change one or more preference and/or requirement settings, for example. In addition to the password or PIN, the consumer is requested to set up a second authentication factor, including, for example, and without limitation, providing a biometric sample that is to be associated with the other registration information provided.

Biometric samples include, without limitation, a fingerprint image, a voice recording, a retinal image, facial recognition, palm print image, iris recognition, and the like. The biometric sample is unique to the consumer 22 and difficult to duplicate and/or forge by an unauthorized user. The biometric sample is stored and associated with a biometric identifier, for example, by the virtual device authentication system 46 (e.g., in the database 26, etc.). Additionally, the biometric identifier is associated with the stored registration information and facilitates secure authorization of the consumer 22. A biometric input device in communication with the consumer device 28$_{a-c}$ may be used for the consumer 22 to enter the biometric sample. For example, the consumer device 28$_{a-c}$ may include an integral fingerprint or palm reader/scanner, retinal or iris reader/scanner, and/or voice reader/recorder.

In other suitable embodiments, the second factor may include, for example, and without limitation, SMS two-factor authentication (where a one-time use short code is sent to the consumer's mobile device via SMS), Time-Based One Time Password (TOTP) authentication (where an authenticator application provides a short code as a second factor), push-based two-factor authentication (where a prompt is sent to the consumer's mobile device), or any other two-factor authentication method that enables the method 600 to operate as described herein.

At operation 620, the virtual device authentication system 46 generates the virtual device authentication service account for the consumer 22, associating the consumer's one or more payment cards with the account along with the consumer's account access credentials.

Figure 7:
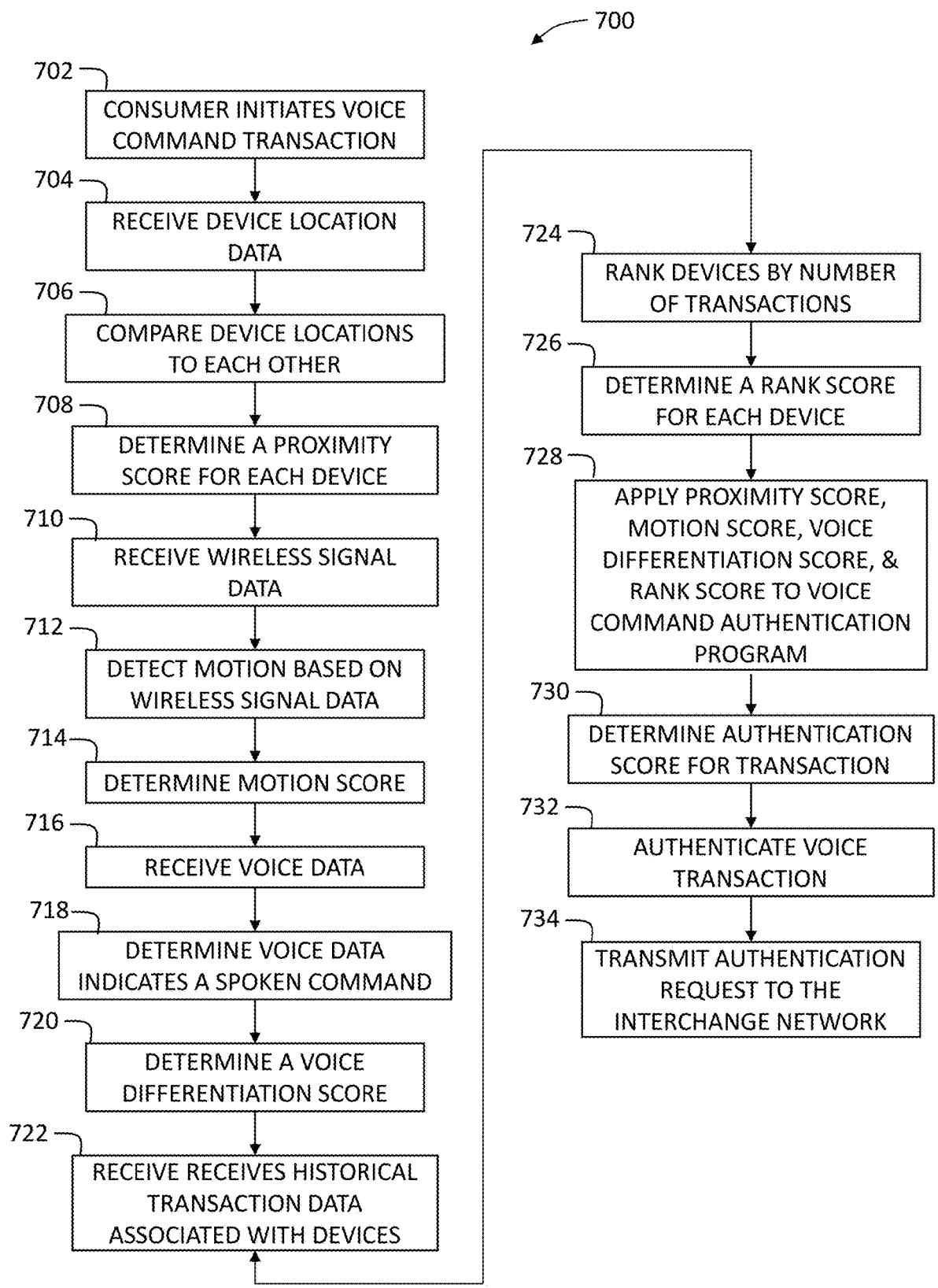
FIG. 7 is a flowchart illustrating an exemplary computer-implemented method for authenticating a voice command transaction request from a voice-activated computing device, in accordance with one embodiment of the present disclosure.

FIG. 7 is a flowchart illustrating an exemplary computer-implemented method 700 for authenticating a voice command transaction request from a voice-activated computing device, in accordance with one embodiment of the present disclosure. The operations described herein may be performed in the order shown in FIG. 6 or may be performed in a different order. Furthermore, some operations may be performed concurrently as opposed to sequentially. In addition, some operations may be optional.

The computer-implemented method 700 is described below, for ease of reference, as being executed by exemplary devices and components introduced with the embodiments illustrated in FIGS. 1-5. In one embodiment, the method 700 may be implemented by the payment card network system 10 (shown in FIG. 1). In the exemplary embodiment, the method 700 relates to a voice-initiated transaction performed by a user, such as the consumer 22, of a digital assistant, such as the voice-activated computing device 40. While operations within the method 700 are described below regarding a consumer device the method 700 may be implemented on other such computing devices and/or systems through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

At operation 702, the consumer 22 places a voice command transaction request with the voice-activated computing device 40, and the request is received by the virtual device authentication system 46. For example, the consumer 22 may issue a voice command to the voice-activated computing device 40 to perform a transaction. In one embodiment, the voice command transaction may be initiated in order to pay for an item or service from a merchant (e.g., the merchant 12). The voice command transaction request includes, for example, a transaction amount (i.e., a value of the items or services purchased), transaction location, a merchant category code (MCC) for the merchant, and a transaction time.

Once the voice command transaction is initiated, at operation 704, the virtual device authentication system 46 receives a location (e.g., a geolocation) of each of the consumer's devices $28_{a-c}$ and the voice-activated computing device 40. For example, the virtual device authentication system 46 may retrieve a location of the voice-activated computing device 40 from the database 26, and more particularly, the virtual device authentication service account. In addition, the virtual device authentication system 46 may identify the consumer devices $28_{a-c}$ listed in the virtual device authentication service account, and establish communications with each to request each device's geolocation data, for example, via one or more API calls. For example, the virtual device authentication system 46 may receive a first device location for a first consumer device $28_a$ and a second location for a second consumer device $28_b$, etc.

At operation 706, the virtual device authentication system 46 compares the location of each of the consumer devices $28_{a-c}$ to the location of the voice-activated computing device 40. At operation 708, a proximity score, based on a determined distance between a respective consumer device $28_{a-c}$ and the voice-activated computing device 40, may be determined by the virtual device authentication system 46. If the score for a respective consumer device $28_{a-c}$ meets or exceeds a predetermined threshold value, the virtual device authentication system 46 determines that respective device is near the physical location of the voice-activated computing device 40. The proximity score of each consumer device $28_{a-c}$ may be indicative of the consumer's location, and as such, is used as one parameter for authenticating the voice command transaction.

At operation 710, the virtual device authentication system 46 receives wireless signal data from the voice-activated computing device 40, which is wirelessly coupled to the wireless modem/router 24 (i.e., the wireless access point). At operation 712, the wireless signal data is used to detect motion, and more particularly, motion indicating the presence of a person proximate the voice-activated computing device 40. More particularly, in the example embodiment, human detection is based on monitoring the channel state information (CSI) of a channel used by the voice-activated computing device 40 and wireless modem/router 24, wherein the channel is, for example, in the consumer's home Wi-Fi network. CSI may be used to characterize the channel state properties of Wi-Fi signals. Wi-Fi standards, such as IEEE 802.11n/ac, rely on the orthogonal frequency division multiplexing (OFDM) technique. The OFDM divides a channel into multiple subcarriers and use multiple-input/multiple-output (MIMO) technology to boost wireless data transmission speed. Each CSI value represents a subcarrier's channel quality (i.e., channel frequency response) for each input-output channel.

The mathematical definition of the CSI value is presented below, with $x_i$ being the $N_T$ dimensional transmitted signal and $y_i$ being the $N_R$ dimensional received signal in subcarrier number i. For each subcarrier i, the CSI information $H_i$ can be obtained based on the following equation:

$$y_i = H_i x_i + n_i,$$

where $n_i$ represents a noise vector. Without considering the noise, it can be known from the CSI value equation that the matrix $H_i$ transfers the input signal vector $x_i$ to the output signal vector $y_i$. This provides the intuition about why the channel information is encoded in (and hence represented by) the matrix $H_i$. Commodity Wi-Fi devices can record thousands of CSI values per second from numerous OFDM subcarriers. Therefore, even for subtle CSI variations caused by motion, the CSI values can still provide descriptive information.

In the example embodiment, a multi-path effect process is used for human motion detection. The multipath effect refers to the signal propagation phenomenon that a wireless signal reaches a receiving antenna along two or more paths. In an example, a receiver (RX) receives multiple copies from a common signal along multiple paths, a line-of-sight (LoS) path, a reflection from the human within a LoS of RX, and a reflection from furniture in a LoS of RX. Different lengths of the paths along which the Wi-Fi signals are sent result in phase changes of the signals, thereby leading to various CSI values. Therefore, human motion can change the paths of Wi-Fi signals and further cause the CSI values to change. For example, when the human moves from a first location to a second location, the new signal reflection path is being substituted for the original one. The move can thus distort the CSI values observed at RX.

In the exemplary embodiment, the virtual device authentication system 46 detects human motions using a real-time hyper-ellipsoidal outlier detection method over non-stationary CSI data streams. It improves accuracy over the typical moving average method, which detects an anomaly based on a threshold of the distance between current value and the average of old values, from two aspects. First, the method employs a new distance metric, i.e., Mahalanobis distance, which is more accurate. Second, the method exploits exponential moving average (EMA) to update the previous sample mean. This detection method can be mathematically described as follows. Let $X_k=\{x_1, \ldots, x_k\}$ be the first k samples of CSI readings. Each sample is a d×1 vector, where d is the number of chosen components. The sample mean $m_k$ and sample covariance $S_k$ are given by $$m_k = \frac{1}{k}\sum_{i=1}^{k} x_i, \; S_k = \frac{1}{k-1}\sum_{i=1}^{k}(x_i - m_k)(x_i - m_k)^T$$

The Mahalanobis distance of a sample reading r from the $X_k$ is defined as $$D(r, X_k) = \sqrt{(r-m_k)^T S_k^{-1}(r-m_k)}$$

By using Mahalanobis distance, the virtual device authentication system 46 considers the reading r as an anomaly if $D(r, X_k) > t$, where t is a predetermined threshold parameter. All of the points bounded by $D(r, X_k) \leq t$ are considered as normal readings.

When the Mahalanobis distance is applied to the non-stationary CSI streams, the sample mean is updated by $$m_{k+1} = \alpha m_k + (1-\alpha) x_{k+1}$$

where $\alpha \in (0, 1)$ denotes a forgetting factor. The closer the receiving of a CSI value reading is, the larger weight it has to determine the next sample mean.

The virtual device authentication system 46 then applies the Butterworth low-pass filter to filter out high frequency CSI, since human motions cannot be generated too fast. Specifically, the CSI variations caused by human motions typically happen in the low frequency domain (i.e., less than 100 Hz). Given a proper cut-off frequency (e.g., about 100 Hz), high frequency noise can be removed by the filter.

At operation 714, a motion score, based on result of the motion detection process, may be determined by the virtual device authentication system 46. If the motion score meets or exceeds a predetermined threshold value, the virtual device authentication system 46 determines that human motion is detected proximate the physical location of the voice-activated computing device 40. The motion score may be indicative of the consumer's location, and as such, is used as another parameter for authenticating the voice command transaction.

At operation 716, the virtual device authentication system 46 receives voice data from the voice-activated computing device 40. More particularly, the virtual device authentication system 46 receives voice data corresponding to the voice command issued by the consumer 22.

At operation 718, the voice data is used to determine whether the voice data is indicative of a command spoken live by the consumer 22 to the voice-activated computing device 40 or an electronic recording of the consumer's voice presented to the voice-activated computing device 40. Speech originating from an organic speaker is defined by a fundamental frequency that exists in the bass region, leaving the sub-bass region devoid of energy. In contrast, audio created by an electronic speaker will have more energy in the sub-bass region due to the resonance of the enclosure. Air coming from the vocal cords of a human passes through the larynx, which generates the fundamental frequency of human voice. This sound then passes through the mouth where articulators further refine the speech. The lips, teeth, tongue, and nasal cavity make up the articulators. By detecting the relative amount of energy in the sub-bass region, the virtual device authentication system 46 can differentiate between electronic and organic speakers.

The simplest way to check for sub-bass over-excitation is through inspection of a voice command's Fast Fourier Transform (FFT). The FFT is an algorithm that divides a signal into its different frequency components and their amplitudes. Once again, sub-bass over-excitation is the presence of a driven component in the sub-bass region of a voice command. While organic speakers (e.g., the consumer 22) fundamentally lack driven sub-bass components, an electronic speaker produces them due to enclosure resonance. The virtual device authentication system 46 calculates the FFT of the voice data received from the voice-activated computing device 40 (i.e., the voice command). The sub-bass region in voice data played through an electronic speaker has a higher intensity than the same region in the spoken command.

The virtual device authentication system 46 crops the FFT down to contain only frequencies between twenty Hertz (20 Hz) and two hundred and fifty Hertz (250 Hz). By cropping the FFT, the sub-bass region becomes a larger portion of the total energy represented. This means that smaller changes in the amount of spectral energy in the sub-bass region will result in larger changes to the normalize energy balance. Additionally, the FFT cropping allows the virtual device authentication system 46 to identify a second phenomenon that is common with small and low end speakers: such speakers struggle to reproduce bass frequencies. This means that electronic speakers produce too much energy in the sub-bass region, while simultaneously having too little energy in the bass region. This causes the energy curve from an electronic speaker to further deviate from that of an organic speaker.

At operation 720, a voice differentiation score, based on a result of the voice determination process, may be determined by the virtual device authentication system 46. If the voice differentiation score meets or exceeds a predetermined threshold value, the virtual device authentication system 46 determines that the voice data was produced by a spoken command, rather than a recorded command. The voice differentiation score, in some embodiments, may be indicative of a confidence that the voice data is produced by a live voice rather than an electronic recording.

At operation 722, the virtual device authentication system 46 receives historical transaction data associated with the consumer devices $28_{a-c}$. In particular, the virtual device authentication system 46 retrieves the historical transaction data from the database 26. Each transaction in the historical transaction data is associated with a particular payment device, such as one of the consumer devices $28_{a-c}$.

At operation 724, the virtual device authentication system 46 sorts, or ranks, the consumer devices $28_{a-c}$ based on the number of transactions associated with each. This ranking (e.g., stack ranking) identifies the consumer's most preferred device, among the consumer devices $28_{a-c}$, for performing transactions. For example, the consumer device with the most associated transactions, may be considered the consumer's preferred device, as it is used most often. A rank score, based on the rank position of the respective device, may be determined by the virtual device authentication system 46 for each of the consumer devices $28_{a-c}$ at operation 726. The rank score of each consumer device $28_{a-c}$ is used as an additional parameter for authenticating the voice command transaction.

At operation 728, the virtual device authentication system 46 applies the proximity score of each consumer device $28_{a-c}$, the motion score, the voice differentiation score, and the rank score of each consumer device $28_{a-c}$ together to a voice command authentication program or model for analysis to determine whether to authenticate the voice command transaction. The voice command authentication program may comprise a machine learning program or technique. The program may scrutinize the input data using one or more machine learning techniques to generate one or more correlations or other relational observations. The program and/or machine learning program(s) may therefore recognize or determine whether a consumer, such as the consumer 22, has placed a spoken voice command transaction request with his or her voice-activated computing device 40. The machine learning techniques or programs may include graph-based techniques, curve fitting, regression model builders, convolutional or deep learning neural networks, combined deep learning, pattern recognition, or the like. Based upon this data analysis, the program and/or machine learning program(s) may be configured to authenticate voice command transactions, as discussed in more detail below.

In supervised machine learning, the voice command authentication program may be provided with example inputs (i.e., sample data relating to the transaction data, voice data, and/or motion detection data variables) and their associated outputs, and may seek to discover a general rule that maps inputs to outputs, so that when subsequent novel inputs are provided the processor may, based upon the discovered rule, accurately predict the correct output. In unsupervised machine learning, the program may be required to find its own structure in unlabeled example inputs.

In the example embodiment, the voice command authentication program combines the scores based on the transaction data. As discussed above, the transaction data includes at least a transaction amount, transaction location, transaction time, and an MCC for the merchant.

At operation 730, the virtual device authentication system 46 determines an authentication score for the voice command transaction. If the authentication score meets or exceeds a predetermined threshold value, the virtual device authentication system 46 authenticates the transaction request, at operation 732.

Based upon the received voice command transaction and associated transaction authorization request, the transaction data (broadly, transaction parameters) is used to decide which score should be of the highest priority. The highest priority score is placed in the center of a spanning tree. The virtual device authentication system 46 determines the priority of the scores, for example, based on predetermined factors for each transaction parameter. For example, for the transaction amount, a factor or threshold may be set, for example, by the issuer 18 or the consumer 22. A transaction amount that meets or exceeds the threshold may indicate that the voice differentiation score is the highest priority score. For the transaction location, if the transaction is occurring from a remote location that is not very frequent or from outside the consumer's home country, and the transaction amount does not exceed the threshold, the proximity score may be assigned the highest priority. Likewise, for MCC for the merchant, typically used MCC's for the consumer 22 will have a lower precedence than, for example, a riskier merchant, such as a casino MCC. Where the MCC is determined to have a risk value above a predetermined threshold, the voice differentiation score may be the highest priority score. Similarly, for the transaction time, where a transaction is initiated at an uncommon time (e.g., between 12:00 am and 5:00 am), the voice differentiation score may be the highest priority score. As noted, the predetermined factors for each transaction parameter are adjustable and are issuer/consumer dependent.

After the highest priority score has been determined and placed at the center of the spanning tree, the remaining scores are placed on the nodes of the spanning tree. The pairwise distance between the center and the respective nodes is calculated and the variance, $\sigma$, is calculated to determine the degree of spread in the spanning tree. The closer the nodes are to the center, the smaller the defined spanning tree. A small spanning tree denotes all parameters are scoring high authenticity. As such, the resulting authentication score is high, thereby indicating that the transaction may be authenticated.

For example, in one embodiment, when the nodes are initially plotted, each will have a pre-defined 100% value, and the spanning tree will be a small narrow tree. As the various scores are determined by the virtual device authentication system 46, the pairwise distance of the node will start increasing from the center node and its confidence score percentage will start decreasing. A lower confidence score (e.g., the larger the pairwise distance) indicates reduced confidence on the node. However, if the highest priority node has a 100% confidence score (e.g., accuracy), the voice command transaction request will be authenticated and approved, even if the other nodes score less.

In one example embodiment, a threshold value for each node may be predetermined, for example, by the issuer 18 or the consumer 22. If the highest priority score (i.e., the center node) is less than the predetermined threshold value for that score, the voice command authentication program will analyze the next highest priority score to determine whether it meets or exceeds the predetermined threshold for that score. The voice command authentication program will authenticate the voice command transaction request when it identifies a score that exceeds the predetermined threshold. The transaction is declined if the scores do not meet or exceed the predetermined threshold values.

At operation 734, based on authenticating the voice command transaction, the virtual device authentication system 46 transmits the authentication request message to the interchange network 16. The transaction is processed business-as-usual (BAU) by the interchange network 16 by transmitting the payment authorization request message to the issuer 18.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor comprises a general-purpose processor configured using software, the general-purpose processor may be configured as respective different processors at different times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

What is claimed is:

1. A system comprising:
    a voice-activated computing device;
    a computing system comprising:
    a database;
    a transceiver;
    an audio module;
    a memory device; and
    a processor communicatively coupled to the database and the memory device, the memory device storing computer-executable instructions, that when executed by the processor, cause the processor to perform operations comprising:
        receiving a voice command transaction request from the voice-activated computing device associated with a consumer;
        determining a distance between a first consumer device and the voice-activated computing device;
        determining a first proximity score for the first consumer device, the first proximity score based on the distance between the first consumer device and the voice-activated computing device;
        receiving, via the transceiver, wireless signal data from the voice-activated computing device, the wireless signal data including channel state information (CSI);
        extracting the CSI from the wireless signal data, said CSI including a plurality of samples of CSI readings;
        determining a respective distance metric for each of at least a subset of the plurality of samples;
        detecting CSI variations by applying a real-time hyperellipsoidal outlier detection technique on the CSI to compare the respective distance metrics to a predetermined threshold and applying a Butterworth low-pass filter to filter out high frequency CSI from the CSI, the low-pass filter having a cut-off frequency of about 100 Hz;
        detecting motion indicating the presence of a person proximate the voice-activated computing device based on the detected CSI variations;
        based on the motion detection, determining a motion score;
        receiving, via the audio module, voice data from the voice-activated computing device;
        determining a voice differentiation score based on the voice data;
        determining a first rank score for the first consumer device, the first rank score based on historical transaction data associated with the first consumer device;
        analyzing, using a voice command authentication model, the first proximity score, the motion score, the voice differentiation score, and the first rank score, the voice command authentication model comprising a machine learning program stored in the memory device; and
        based on the analysis, determining an authentication score for the voice command transaction request.

2. The system in accordance with claim 1, said computer-executable instructions cause the processor to perform operations comprising:
    determining a second proximity score for a second consumer device, the second proximity score based on a distance between the second consumer device and the voice-activated computing device;
    receiving, from the first consumer device, a first location of the first consumer device;
    receiving, from the second consumer device, a second location of the second consumer device; and
    retrieving a third location of the voice-activated computing device from the database.

3. The system in accordance with claim 2,
    said operation of determining the first proximity score comprising the operation of comparing the first location to the third location to determine the distance between the first consumer device and the voice-activated computing device, and
    said operation of determining the second proximity score comprising the operation of comparing the second location to the third location to determine the distance between the second consumer device and the voice-activated computing device.

4. The system in accordance with claim 1, said computer-executable instructions cause the processor to perform an operation of determining whether the voice data is indicative of a command spoken live by the consumer to the voice-activated computing device or an electronic recording of the consumer presented to the voice-activated computing device.

5. The system in accordance with claim 4, said operation of determining whether the voice data is indicative of a command spoken live comprising applying a Fast Fourier Transform (FFT) algorithm to the voice data to calculate the FFT of the voice data.

6. The system in accordance with claim 5, said operation of determining whether the voice data is indicative of a command spoken live further comprising cropping the FFT of the voice data to contain frequencies between about 20 Hz and 250 Hz.

7. The system in accordance with claim 1, said computer-executable instructions cause the processor to perform an operation of determining a second rank score for a second consumer device, the second rank score based on historical transaction data associated with the second consumer device, said operation of determining the first rank score comprising the operation of retrieving, from the database, the historical transaction data associated with the first consumer device, said operation of determining the second rank score comprising the operation of retrieving, from the database, the historical transaction data associated with the second consumer device, and said computer-executable instructions cause the processor to perform an operation of ranking the first and second consumer devices based on the number of transactions associated with each respective consumer device.

8. The system in accordance with claim 1, said computer-executable instructions cause the processor to perform operations comprising: determining that the authentication score meets or exceeds a predetermined threshold value; and based on the determination, transmitting the voice command transaction request to an interchange network.

9. A method comprising:
receiving, by a virtual device authentication system, a voice command transaction request from a voice-activated computing device associated with a consumer;
determining, by the virtual device authentication system, a distance between a first consumer device and the voice-activated computing device;
determining, by the virtual device authentication system, a first proximity score for the first consumer device, the first proximity score based on the distance between the first consumer device and the voice-activated computing device;
receiving, by a transceiver of the virtual device authentication system, wireless signal data from the voice-activated computing device, the wireless signal data including channel state information (CSI);
extracting, by the virtual device authentication system, the CSI from the wireless signal data, said CSI including a plurality of samples of CSI readings;
determining, by the virtual device authentication system, a respective distance metric for each of at least a subset of the plurality of samples;
detecting, by the virtual device authentication system, CSI variations by applying a real-time hyper-ellipsoidal outlier detection technique on the CSI to compare the respective distance metrics to a predetermined threshold and applying a Butterworth low-pass filter to filter out high frequency CSI from the CSI, the low-pass filter having a cut-off frequency of about 100 Hz;
detecting, by the virtual device authentication system, motion indicating the presence of a person proximate the voice-activated computing device based on the detected CSI variations;
based on the motion detection, determining a motion score by the virtual device authentication system;
receiving, by an audio module of the virtual device authentication system, voice data from the voice-activated computing device;
determining, by the virtual device authentication system, a voice differentiation score based on the voice data;
determining, by the virtual device authentication system, a first rank score for the first consumer device, the first rank score based on the historical transaction data associated with the first consumer device;
analyzing, by the virtual device authentication system using a voice command authentication model, the first proximity score, the motion score, the voice differentiation score, and the first rank score, the voice command authentication model comprising a machine learning program stored in a memory device; and
based on the analysis, determining, by the virtual device authentication system, an authentication score for the voice command transaction request.

10. The method in accordance with claim 9, further comprising: determining, by the virtual device authentication system, a second proximity score for a second consumer device, the second proximity score based on a distance between the second consumer device and the voice-activated computing device; receiving, by the virtual device authentication system from the first consumer device, a first location of the first consumer device; receiving, by the virtual device authentication system from the second consumer device, a second location of the second consumer device; and retrieving, by the virtual device authentication system, a third location of the voice-activated computing device from a database.

11. The method in accordance with claim 10, said operation of determining the first proximity score comprising the operation of comparing, by the virtual device authentication system, the first location to the third location to determine the distance between the first consumer device and the voice-activated computing device, and said operation of determining the second proximity score comprising the operation of comparing, by the virtual device authentication system, the second location to the third location to determine the distance between the second consumer device and the voice-activated computing device.

12. The method in accordance with claim 9, further comprising determining, by the virtual device authentication system, whether the voice data is indicative of a command spoken live by the consumer to the voice-activated computing device or an electronic recording of the consumer presented to the voice-activated computing device.

13. The method in accordance with claim 12, said operation of determining whether the voice data is indicative of a command spoken live comprising: applying a Fast Fourier Transform (FFT) algorithm to the voice data to calculate the FFT of the voice data; and cropping the FFT of the voice data to contain frequencies between about 20 Hz and 250 Hz.

14. The method in accordance with claim 9, further comprising: determining, by the virtual device authentication system, a second rank score for a second consumer device, the second rank score based on historical transaction data associated with the second consumer device; and ranking, by the virtual device authentication system, the first and second consumer devices based on the number of transactions associated with each respective consumer device, said operation of determining the first rank score comprising the operation of retrieving, by the virtual device authentication system from a database, the historical transaction data associated with the first consumer device, said operation of determining the second rank score comprising the operation of retrieving, by the virtual device authentication system from the database, the historical transaction data associated with the second consumer device.

15. The method in accordance with claim 9, further comprising: determining, by the virtual device authentication system, that the authentication score meets or exceeds a predetermined threshold value; and based on the determination, transmitting, by the virtual device authentication system, the voice command transaction request to an interchange network.

* * * * *